Figure 4:
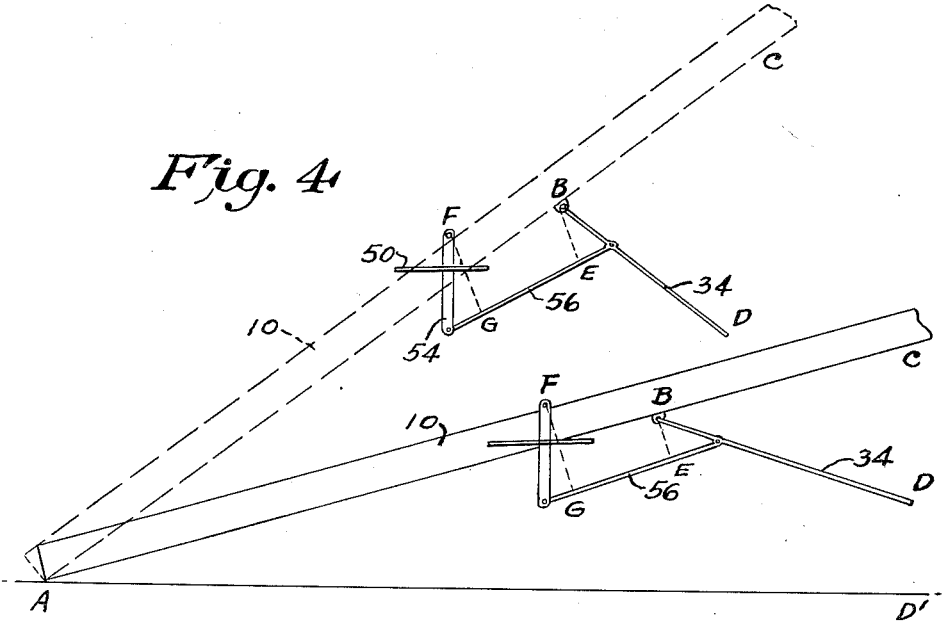

March 30, 1954  R. L. MAYRATH  2,673,639
GRAIN LOADER MECHANISM
Filed Nov. 10, 1950  2 Sheets-Sheet 1
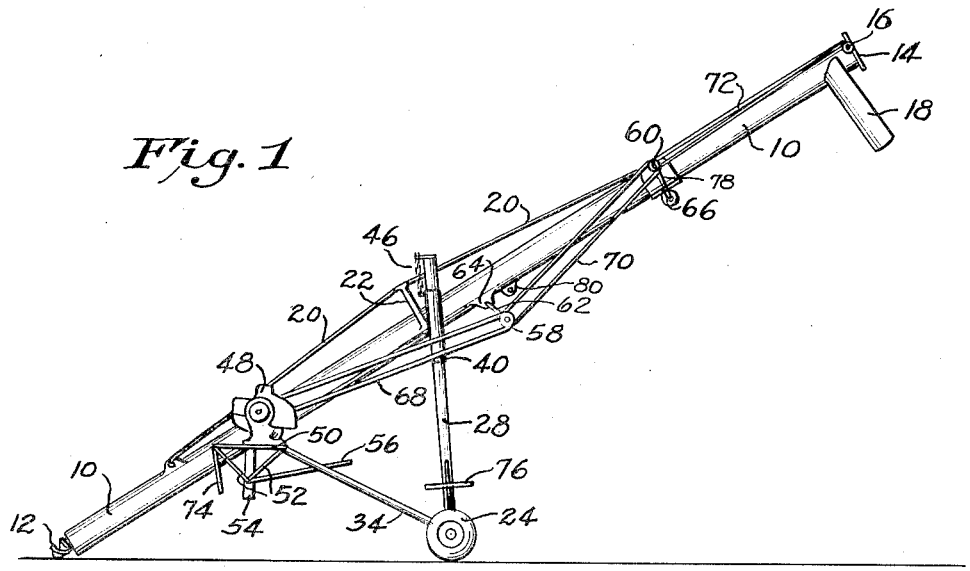
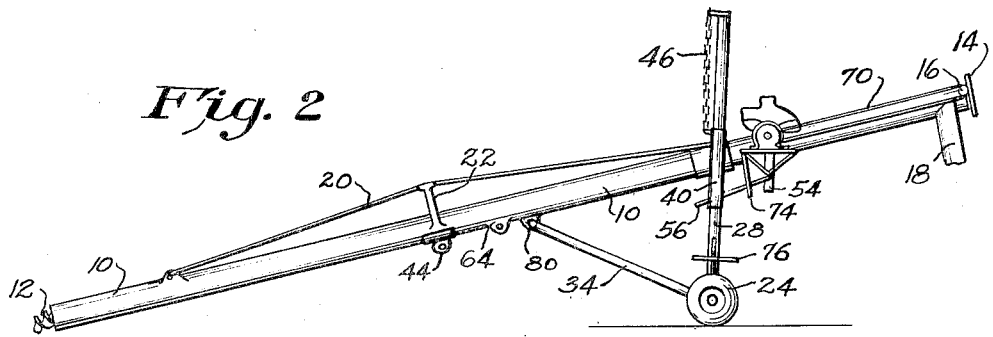
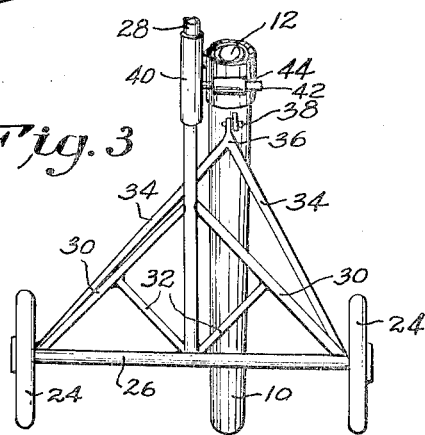
Robert L. Mayrath,
INVENTOR
BY Homer P. Montague
ATTORNEY March 30, 1954  R. L. MAYRATH  2,673,639
GRAIN LOADER MECHANISM
Filed Nov. 10, 1950  2 Sheets-Sheet 2

Robert L. Mayrath,
INVENTOR

BY Homer P. Montague
ATTORNEY

Patented Mar. 30, 1954

2,673,639

UNITED STATES PATENT OFFICE 2,673,639

GRAIN LOADER MECHANISM

Robert L. Mayrath, Dodge City, Kans., assignor to Mayrath Machinery Co., Inc., Dodge City, Kans., a corporation of Kansas Application November 10, 1950, Serial No. 195,021

3 Claims. (Cl. 198—121)

This invention pertains to portable or mobile conveyors of the general type known as grain loaders, although such conveyors are also adapted to lifting and moving of a variety of fluid or pulverulent materials. In particular, the present invention pertains to a very simple but efficient grain loader or conveyor which is intended for use either for moving grain and similar materials to considerable heights or to considerable distances from the pile or initial location, or for removing grain and the like from the interiors of relatively large-diameter bins or storage vessels, even where such vessels are provided with rather narrow access doors. In general, therefore, the present invention deals with conveyor mechanisms whose conveyor elements proper are relatively long, and it is a principal object of the invention to provide a novel combination of a lengthy conveyor element, such as a lengthy auger screw and its housing, with a special arrangement of mounting and supporting elements to enable maximum stability, convenience and utility for the purposes described.

A further important object of the invention is to provide a lengthy auger or screw type of conveyor with a wheeled support of a kind which may be secured beneath the auger housing in either of two distinct positions lengthwise of the conveyor, in either of which positions balance and stability of the complete unit are attained.

An additional object of the invention is to provide an engine-powered loader or conveyor of the above type in which the position of the driving engine, lengthwise of the elongated conveyor housing, may be altered at the same time as is the position of the wheeled support, in order that the weight of the engine may provide a desired and proper approach to perfect balance of the device as a whole. In this connection, it should be understood that perfect balance is not desired, proper operation requiring a slight downward force upon that end of the conveyor (the intake end) which is resting within the mass of grain or similar material which is to be raised and discharged from the upper end of the equipment. An approximate balance, subject to the condition just stated, is desired for convenience in manual movement of the device into or out of a pile of material, or for moving the device from one location to another.

Still another object of the invention is to provide a grain loader or conveyor of the type described in which the elevation of the upper or discharge end of the conveyor may be altered, without seriously disturbing the normally level condition of the driving engine, and hence without subjecting the engine to operation in positions in which its bearings are deprived of lubricating oil or in which the fuel supply might be impaired.

An ancillary object of the invention is to provide a loader of the above type in which the driving engine may be adjusted generally lengthwise of the conveyor housing by means of a mount comprising rails and clamping means, this motor mount structure providing for adjustments to compensate for belt stretching or shrinkage, and being operative in either of the two main positions of attachment of the motor or engine mount to the conveyor housing.

Yet another object of the invention is to provide a loader or conveyor of the kind described above in which a tubular conveyor housing is provided with multiple-function mounting or securing elements, thereby simplifying the structure and enabling easier changing-over from one type of arrangement to the other, as well as effecting economies in manufacture.

Figure 5:
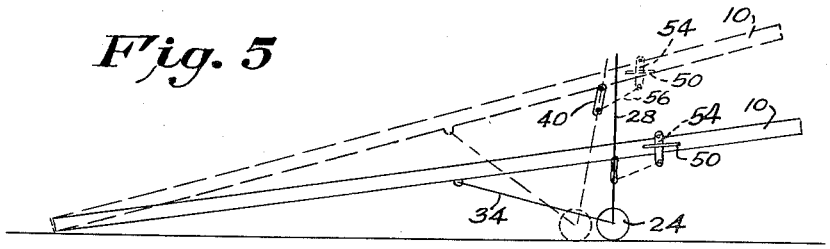

The above and other objects and advantages of the invention will best be understood by referring to the following detailed specification of a preferred embodiment thereof, taken in connection with appended drawings, and in which:

Fig. 1 is a side elevation of the preferred form of the invention with the wheeled support in one location relative to the conveyor or auger housing tube, Fig. 2 is a similar view showing the wheeled support in its other alternative position, Fig. 3 is a fragmentary front elevation of the device, illustrating the general construction of the wheeled framework, Fig. 4 is a diagrammatic side view of the Fig. 1 arrangement in two different positions or adjustments with reference to the discharge height, and Fig. 5 is a view similar to Fig. 4 but illustrating different adjustments of the device when the wheeled framework is in its alternative position with reference to Fig. 4.

Referring now to the drawings, and particularly to Figs. 1 and 3 thereof, there is shown a grain loader or conveyor comprising an elongated tubular housing or body tube 10 within which is disposed an elongated auger screw 12 which may be seen projecting slightly at the lower end of tube 10. The screw 12 has such an outside diameter as to fit loosely within tube 10, and has a central shaft which is supported at the upper end of tube 10 by a bearing carried by a plate which closes the upper end of the tube and which also carries a driven pulley 14 secured on the auger shaft and idler pulleys of which one is indicated by numeral 16. The specific nature and arrangement of the shaft bearing and these pulleys forms no part of the present invention, and one possible arrangement thereof is shown in the U. S. patent to Martin Mayrath, No. 2,483,290. An opening is provided in the under surface of tube 10 near its upper end, through which opening the grain or other material conveyed up the tube by auger 12 is discharged into a chute 18 and thence into a truck, bin, pile or the like. In view of the considerable length of tube 10 (which may be as much as 40 feet or even more), a brace or strut 20 may be secured at its ends to the tubular housing, and tensioned near its midpoint as by a brace 22 welded or otherwise fastened to the tube 10.

In order to support the tube 10 at the proper inclination to provide the desired discharge height, as well as to mount the apparatus for mobility, there is provided a wheeled framework best shown in Figs. 1 and 3 as comprising spaced wheels 24 rotatable upon an axle 26 from the center of which extends a generally upright post 28. The respective ends of axle 26 have secured thereto angularly positioned braces 30 welded or similarly secured to post 28. Auxiliary braces 32 may also be provided, and a pair of radius rods 34, or "wishbone" assembly, is arranged with its lower ends pivoted to the axle and its upper termination 36 pivotally secured to a lug on tube 10 as by a pin 38 or the like. In the arrangement of parts shown in Fig. 1, the radius rods are thus connected, while in Fig. 2 they are connected with another bracket as will be described below.

Vertically slidable on post 28 is a sleeve or collar 40 to which is secured a pivot pin 42 extending horizontally outward, and upon which pin 42 is rotatably mounted a sleeve 44 attached to tube 10. A chain hoist or the like 46 is connected between collar 40 and the upper end of post 28, and enables the elevation of the discharge end (and chute 18) to be adjusted as desired.

Power for rotating auger screw 12 is provided by a motor or gasoline engine 48 which is slidably mounted (for movement generally along tube 10) upon rails such as 50, the rails and their angular braces 52 being carried by a post 54 pivotally slung from the upper side of a collar which encircles the tube 10. The upper pivot point of the engine mount is better shown in Fig. 4, to be described below. The lower end of post 54 is connected with the wishbone or radius rods 34 by a link 56 whose effective length may be varied (within limits) by adjusting the point thereof which is connected pivotally to the radius rod assembly.

To convey the power generated by engine 48 to the auger pulley 14 by means of belts of usual and standard lengths, there are provided intermediate pulley sets 58 and 60. Pulley set 58 is carried by a rod or crank 62 freely pivoted in a pair of lugs 64 secured to housing tube 10, and pulley set 60 is carried by a rod or crank 78 pivoted in sleeve 66 secured to housing tube 10. Belts 68, 70 and 72 connect the drive pulley of engine 48 to pulley set 58, the latter to pulley set 60, and the latter in turn to auger pulley 14 over idlers such as 16. All three belts may be tightened or loosened by moving engine 48 along its rails 50. A lever 74 is linked to the engine position to loosen or tighten the belts, and the engine may be clamped in adjusted position by means of a screw clamp engaging one of the engine-supporting rails. A step 76 is secured to the wheeled framework for convenience in adjusting chain hoist 46.

An inspection of Fig. 1 will indicate that the support provided by post 28 for tube 10 and the parts carried thereby is positioned nearer to the intake (lower) end of the housing tube 10, thus providing for a maximum adjustment of the height of the discharge end (for example, with a 40-foot tube 10, a discharge height of 30 feet may readily be obtained). At the same time, the position of engine 48 to the left of post 28 counterbalances (in fact, slightly overbalances) the overhang of tube 10 to the right of post 28, so that stability and maneuverability are obtained.

Fig. 4 of the drawings shows in diagrammatic form the geometrical arrangement by which engine 48 (through its support rails such as 50) is maintained level for all practical purposes, regardless of changes in inclination of tube 10 due to operation of the hoist 46. In this figure, point A represents the point of contact of tube 10 with the ground, point B the pivotal connection of radius rods 34 to tube 10, point C the upper end of tube 10, point D the outer (right) end of a radius rod 34, and point F the pivotal connection of post 54 atop tube 10. Points G and E are the ends of perpendiculars dropped to link 56 from points F and B respectively.

The effective length of the radius rod or wishbone assembly is made approximately the same as length AB, so that the angle CBD is about twice the angle BAD', where D' is a point on the ground beneath tube 10. Angle CBD thus changes about twice as fast (with adjustment of discharge height) as angle BAD'. Link 56 has such a length, and is connected to radius rod 34 at such a point, that it swings the motor support arm 54 about one-half the angular movement of the radius rod as the auger housing 10 is adjusted, even though the effective lever arms BE and FG may vary during the adjustment. The engine mount (represented by rail 50) then makes half the angular movement with respect to tube 10 that the radius rod makes with respect to the tube 10, and the engine mount remains substantially parallel to the ground. For situations in which the intake end of the tube is not at the same level as the wheels, the effective length of link 56 is made adjustable, as by providing a plurality of pin-holes for connecting it to the radius rod assembly.

The full and dotted line showings in Fig. 4 illustrate the maintenance of a level engine regardless of the inclination of tube 10.

The arrangement described above provides for adjustment of the apparatus to achieve maximum discharge heights while maintaining a level engine. However, in this condition the wheeled support is disposed rather near the intake end of tube 10, and would prevent the use of the loader in removing grain or the like from the farther parts of large-diameter bins having access doors too narrow to admit the wheels 24, or too low to admit post 28. Also, in such operations, it is desirable that engine 48, if a combustion engine, remain outside the bin. To provide for this situation without sacrificing desired balance or maintenance of a level engine, the parts are rearranged as shown in Figs. 2 and 5.

Referring to Fig. 2, it will be seen that the wheeled support 24, 28 has been moved to a point nearer the discharge end of the loader, and the collar which supports the pivot on post 54 has been moved to a point on the tube 10 between post 28 and the discharge end. Also, radius rod assembly 34 is pivoted to lug 80. The pivot member on sleeve 40 has been inserted through the sleeve 66 which formerly carried pulley set 60. The link 56 pivoted to the engine mount is now connected pivotally to a point on the sleeve 40. As shown in Fig. 5, link 56 now forms one side of a trapezoidal linkage, in which the side represented by sleeve 40 is shorter than the side represented by post 54 to which motor rails 50 are attached, and angular movement of sleeve 40 with respect to tube 10 will result in a somewhat smaller angular movement of the motor mount with respect to tube 10, thus causing the motor rail 50 to remain about level with changes in discharge height. Again, where the intake end is not level with wheels 24, the adjustable connection of link 56 to sleeve 40 enables the engine to be levelled as desired.

The advantage of the configuration shown in Figs. 2 and 5 is that almost three-fourths of the length of tube 10 adjacent the intake end is rendered clear of obstructions which would prevent the fullest entry of tube 10 into a large diameter enclosure or bin. Also, the reduced height or inclination of tube 10 enables it to be used without serious limitation because of low access doors, and the engine weight to the right of main support post 28 balances the leftward extension of tube 10. Additionally, the engine exhaust is maintained outside the enclosure of a bin, silo or the like.

It is believed that the advantages of my improved construction will be fully appreciated from the above disclosure of its principles and practice, but I wish it to be understood that the invention is not limited to the precise details of construction shown herein, but only by the scope of the appended claims.

I claim:

1. In a mobile conveyor of the auger type having an elongated housing tube, an auger screw rotatable in said tube, a wheeled framework including an upwardly extending post and means slidably mounted on said post for pivotally supporting said tube intermediate its ends, the improvement which comprises an engine mount pivotally suspended from said tube, at least one radius rod pivoted to said framework at one end and to said tube at its other end, and a link pivotally connected at one end to said engine mount and selectively connectable at its other end either to said radius rod or to said slidably mounted means, whereby said engine mount is rendered self-levelling with variations of inclination of said tube for either of two selected positions of said slidably mounted means lengthwise of said tube.

2. In a mobile conveyor of the auger type having an elongated housing tube, an auger screw rotatable in said tube, a wheeled framework including an upright post, and means slidably mounted on said post for pivotally supporting said tube intermediate its ends, the improvement which comprises an engine mount pivotally suspended from said tube at one of two positions lying on opposite sides of said post, at least one radius rod pivotally connected to said wheeled framework at one end and to said tube at its other end, and a mounting formation on said tube adapted to pivotally receive an idler pulley mount when said engine mount is in one of its positions on the tube, and to pivotally receive the said slidable means on said post when said engine mount is in the other of its positions.

3. In an auger conveyor of the type having a tubular auger housing mounted for inclination to vary the height of its discharge end, a support structure for said housing including a substantially vertical post to which said housing is connected for vertical support, at least one radius rod pivoted at one end on said support structure at the level of the lower end of said post, said radius rod extending generally in a direction away from the discharge end of said housing and having its other end pivoted at a fixed point on the underside of said housing spaced from the lower end of said housing a distance substantially equal to the effective length of said radius rod, a motor support pivotally suspended from the upper side of said housing, and a link pivotally connected to said radius rod and to said motor support, the parts being so dimensioned that the variation in angle between the housing and radius rod, for different angular elevations of said housing, produces a change of angle between said housing and motor support of one-half said variation.

ROBERT L. MAYRATH.

References Cited in the file of this patent

UNITED STATES PATENTS

| Number | Name | Date |
|---|---|---|
| 2,444,521 | Mulkey | July 6, 1948 |
| 2,483,290 | Mayrath | Sept. 27, 1949 |
| 2,511,672 | Kemmer | June 13, 1950 |
| 2,528,917 | Slocum | Nov. 7, 1950 |